June 30, 1970 W. B. GLENDINNING 3,518,132

CORROSIVE VAPOR ETCHING PROCESS FOR SEMICONDUCTORS USING COMBINED VAPORS OF HYDROGEN FLUORIDE AND NITROUS OXIDE

Filed July 12, 1966

INVENTOR,
WILLIAM B. GLENDINNING.

BY Harry M. Saragovitz, Edward J. Kelly, Herbert Berl & Julian C. Keppler ATTORNEYS.

United States Patent Office
3,518,132
Patented June 30, 1970

3,518,132

CORROSIVE VAPOR ETCHING PROCESS FOR SEMICONDUCTORS USING COMBINED VAPORS OF HYDROGEN FLUORIDE AND NITROUS OXIDE

William B. Glendinning, Monmouth, N.J., assignor to the United States of America as represented by the Secretary of the Army Filed July 12, 1966, Ser. No. 564,705
Int. Cl. H01l 7/34
U.S. Cl. 156—17 8 Claims

ABSTRACT OF THE DISCLOSURE

This disclosure relates to etching processes and particularly to etching by means of a vapor.

More particularly this disclosure describes the use of the combined vapors of hydrogen fluoride and of nitrous oxide applied to the surface of a semiconductor to cause a corrosive growth on the surface. This corrosive growth is removed by dissolving in a solution such as sodium hydroxide to leave an etched surface.

BACKGROUND OF THE INVENTION

Etching processes are well known and are applicable to many materials and types of surfaces. Most of these processes use strong chemical reagents, in liquid form, applied directly to the surface to be etched. Certain materials, and particularly metals, can also be etched by chemical vapors, but usually at extremely high temperatures with respect to the metal and under difficult mechanical, as well as thermal and chemical, conditions.

It is therefore an object of this invention to provide an improved process for etching.

It is a further object of this invention to provide an improved process for etching metallic semiconductors.

It is a further object of this invention to provide an improved, low-temperature, vapor process for producing a highly controllable etch on certain metals.

These and other objects are accomplished by exposing the cleaned surface of the metallic sample to vapors of hydrogen fluoride and nitrous oxide for a given time at room temperature, and then dissolving the corroded surface of the metallic sample in a wash of dilute alkaline solution, such as sodium hydroxide, for a given time at room temperature.

This invention will be better understood and further objects of this invention will become apparent from the following specification and the drawings of which—

Figure 1:
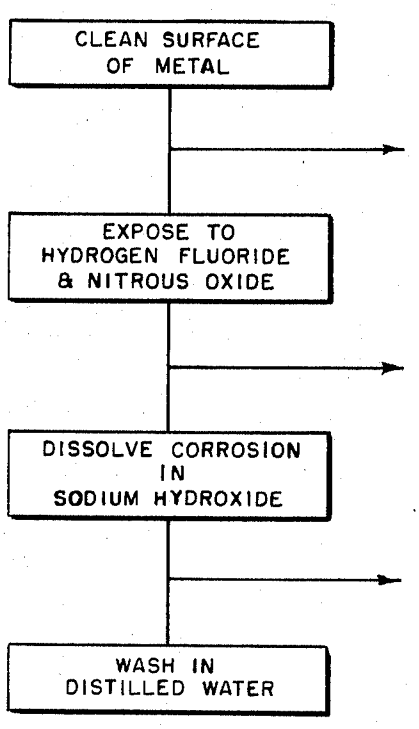
Figure 2:
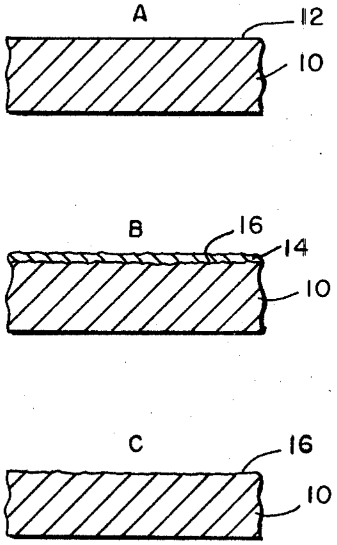

FIG. 1 shows a series of blocks labeled to illustrate the sequence of steps of this process, and FIG. 2 shows a series of cross-sections of a sample illustrating the changes in the surface of the sample during this etching process.

The surface of the sample to be etched is first cleaned in a well known manner by immersing the sample, first, in a bath of organic solvent such as trichloroethylene, then in a bath of acetone, then in a bath of ethyl alcohol and, lastly, washing the sample in distilled water. The cleaned surface is then oven dried for processing.

The first chemical process takes place in a container of inert material, such as Teflon or polyethylene, large enough to include a sufficient amount of the reagent vapors and to maintain the desired concentrations of the vapors during the etching process. This container is quite similar to containers used in vapor processes for diffusion or epitaxial growth of a silicon surface. However, the methods are otherwise different and produce a different result.

The sample is placed in the container in an atmosphere of argon, oxygen, or air at atmospheric pressure and room temperature. Openings are provided in the container for the introduction and the exhaust of the vapors in a well known manner.

The hydrogen fluoride vapor and the nitrous oxide vapor are introduced separately through tubes connected to the openings in the container, and the flow of each of the vapors into the container is controlled by flow valves and is monitored until the desired amounts of the respective vapors are being introduced into the container. The flow of vapors through the container is maintained at a constant rate for the length of time necessary for the chemical reactions.

The action of the vapors on the metallic surface causes a corrosion in the form of a diffusion or epitaxial growth. This eats away the original surface of the metal to build up a film, or corrosion layer, composed of the products of the chemical reaction.

The vapors are removed from the container by clearing it with free air, argon, or other inert gas applied through tubing connected to one of the openings in the container.

The sample is then removed from the container and is immersed in a bath of an alkaline solution, such as a solution of sodium hydroxide, for a sufficient length of time to entirely dissolve the corrosion layer produced by the chemical action of the vapor. This leaves an etched surface on the original metal.

FIG. 2A shows a cross-section of a typical sample 10 of a metallic semiconductor with a mechanically smooth surface 12 that has been cleaned in preparation for etching in accordance with this process.

FIG. 2B shows the same cross-section of the sample 10 with the smooth surface 12 now altered by the corrosive growth, due to the contact of the hydrogen fluoride and nitrous oxide vapors with the metallic surface, to the extent illustrated by the corrosion layer 14. The surface of the original material of the sample 10 is now established by the chemically the chemistry formed junction 16 between the original sample 10 and the corrosion layer 14. This is, in effect, an etched surface.

FIG. 2C illustrates the original sample 10 with the corrosion layer 14 dissolved by the bath of sodium hydroxide. The original surface is reduced by the amount of metal drawn into the corrosion layer 14, and the original, mechanically-polished surface 12 is replaced by the etched surface 16.

In the typical etching of a silicon substrate, in a plastic container of about 3 cubic inches, the hydrogen fluoride vapor and the nitrous oxide vapor are mixed with argon gas and controlled by flow meters to provide about 1%, by volume, concentration of each vapor flowing through the container for ten minutes at atmospheric pressure and room temperature. This produces a corrosion layer on the surface of the substrate.

The silicon substrate is then removed from the plastic container and put in a 10% solution of sodium hydroxide for about a half a minute to dissolve the corrosion layer.

The silicon substrate is then washed in hot, distilled water for about five minutes to remove the chemical reagents. This produces a 4 micron etch of the surface of the silicon substrate.

The corrosive action and the resultant etch may be increased or decreased by an increase or decrease in the length of time that the metallic surface is exposed to the hydrogen fluoride and nitrous oxide vapors. The corrosive action may also be varied by changing the concentration of the chemical vapors.

Certain other reagent vapors may be added to or substituted for the vapors specified here. For example, nitric oxide vapor, of about the same concentration, may be used in place of nitrous oxide vapor, since they are similar in chemical activity.

The immersion in the bath of the sodium hydroxide solution may be long enough to completely dissolve the corrosion layer. To length of time, while not critical, should not be prolonged to the point where additional, undesirable, chemical reaction will take place.

Since the only function here is to dissolve the corrosion layer, other reagents, for example other hydroxides, may be used here as long as they completely dissolve the corrosion layer without damaging the silicon substrate.

The distilled water for the final wash should be heated to more quickly and thoroughly remove all traces of the persistent, sodium hydroxide solution. Excessive washing is not harmful.

Along with the reagent vapors, about 1% of water vapor reaches the plastic container. This appears to be desirable for the process. Water vapor of this, or other, concentrations may be added separately if desired.

The process described here is accomplished by the flow of the reagent vapors, of the proper concentrations, through the container. It will be apparent that the same effect may also be accomplished by filling the container with the proper concentrations of vapors, and sealing it for the length of time necessary to produce the corrosive growth for the desired etching depth.

Since the resultant etch is a function of the corrosive growth, the depth of the etch may be determined by the thickness of the corrosion layer. Therefore, by providing means for measuring the thickness of the corrosion layer, the depth of the etch can be accurately monitored during the process.

This process may be applied to most of the known forms of selective etching. The surface may be masked with a suitable resist or other device that is impervious to the corrosive vapors and will keep the corrosive vapors off the portion of the surface that is not to be etched. This mask or resist can be removed, in the normal manner, when the desired etch of the surface is completed.

What is claimed is:

1. An etching process for silicon comprising the steps:
cleaning the surface to be etched;
exposing said surface to be etched to a combination of hydrogen fluoride and oxidizing vapors to cause a corrosive growth on said surface;
dissolving said corrosive growth in a hydroxide bath to leave an etch on said surface;
and washing said etched surface.

2. An etching process, as in claim 1, wherein said oxidizing vapor is one of nitrous oxide.

3. An etching process, as in claim 1, wherein said oxidizing vapor is one of nitric oxide.

4. An etching process for silicon comprising the steps:
cleaning the surface to be etched;
exposing said surface to be etched to an atmosphere of hydrogen fluoride and nitrous oxide vapors;
dissolving the resultant corrosion layer in a hydroxide bath; and washing the resultant, etched surface.

5. An etching process as in claim 4 wherein said surface to be etched is cleaned in successive baths of trichloroethylene, acetone, ethyl alcohol, and distilled water; and is then oven-dried before being exposed to said vapors.

6. An etching process as in claim 4 wherein said corrosion layer is dissolved in a bath of sodium hydroxide.

7. A process for etching the surface of a silicon semiconductor comprising the steps:
cleaning said surface in a bath of organic solvent;
oven-drying said surface;
exposing said surface to an atmosphere of hydrogen fluoride and nitrous oxide vapors at atmospheric pressure and room temperature to corrode an outer layer of said surface;
dissolving said layer of corrosion in a bath of sodium hydroxide at atmospheric pressure and room temperature; and
washing the resultant, etched surface of said semiconductor in hot, distilled water.

8. A process for etching the surface of a silicon semiconductor comprising the steps:
cleaning said surface of said semiconductor in a bath of organic solvent;
oven-drying said surface of said semiconductor;
mounting said semiconductor in an inert container having intake and exhaust ports;
applying a combination of 1% hydrogen fluoride vapor, 1% nitrous oxide vapor, and 1% water vapor to one of said intake ports of said container for 10 minutes to produce a corrosive growth on said surface of said semiconductor;
removing said semiconductor from said container;
dissolving said corrosive growth from said surface of said semiconductor in a 10% solution of sodium hydroxide for one-half minute;
washing the resultant, etched surface of said semiconductor in hot, distilled water for at least 5 minutes.

References Cited

UNITED STATES PATENTS

| | | | |
|---|---|---|---|
| 2,153,577 | 4/1939 | Levine | 134—26 |
| 2,154,027 | 4/1939 | Brennan | 156—23 |
| 2,900,531 | 2/1951 | Zadémach et al. | 156—23 X |
| 2,900,531 | 8/1959 | Wallmark. | |
| 3,030,238 | 4/1962 | Cohn | 134—26 |
| 3,073,765 | 1/1963 | Adams | 156—23 X |
| 3,115,424 | 12/1963 | Eannarino | 156—17 X |
| 3,220,899 | 11/1965 | Leonard | 156—23 |

FOREIGN PATENTS

| | | |
|---|---|---|
| 718,583 | 9/1965 | Canada. |
| 1,193,766 | 5/1965 | Germany. |

JOHN T. GOOLKASIAN, Primary Examiner
J. C. GIL, Assistant Examiner

U.S. Cl. X.R.

134—26; 252—79.3, 79.5